（12）United States Patent
Bill

(10) Patent No.: US 12,115,819 B2
(45) Date of Patent: Oct. 15, 2024

(54) AIRCRAFT SYSTEM AND METHOD FOR DETERMINING CURRENT TIRE PRESSURE

(71) Applicant: AIRBUS OPERATIONS LIMITED, Bristol (GB)

(72) Inventor: Andrew Bill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 441 days.

(21) Appl. No.: 17/409,045

(22) Filed: Aug. 23, 2021

(65) Prior Publication Data

US 2022/0134812 A1    May 5, 2022

(30) Foreign Application Priority Data

Oct. 30, 2020   (GB) ..................................... 2017260

(51) Int. Cl.
  *B60C 23/00*   (2006.01)
  *B64F 5/60*   (2017.01)

(52) U.S. Cl.
  CPC .............. *B60C 23/002* (2013.01); *B64F 5/60* (2017.01)

(58) Field of Classification Search
  CPC .............. B60C 23/002; B60C 23/0477; B60C 23/0476; B60C 23/0486; B60C 23/20; B60C 23/0474; B64F 5/60; B64C 25/36; G01L 17/00; G01M 17/02
  See application file for complete search history.

(56) References Cited

U.S. PATENT DOCUMENTS

| | | | |
|---|---|---|---|
| 8,599,044 B2 | 12/2013 | Maggiore et al. | |
| 2006/0235652 A1 | 10/2006 | Rimkus et al. | |
| 2015/0134197 A1* | 5/2015 | Cahill | B60C 23/0486 |
| | | | 701/33.7 |
| 2017/0096037 A1* | 4/2017 | Smith | B60C 23/0488 |
| 2020/0277086 A1* | 9/2020 | Arnoux | B64F 5/60 |

FOREIGN PATENT DOCUMENTS

| | | |
|---|---|---|
| EP | 2 910 393 | 8/2015 |
| EP | 3 069 904 | 9/2016 |
| EP | 3 118 030 | 1/2017 |
| EP | 3 498 501 | 6/2019 |
| EP | 3 715 152 | 9/2020 |
| EP | 3 772 420 | 2/2021 |
| WO | 2015/143451 | 9/2015 |

OTHER PUBLICATIONS

Combined Search and Examination Report for GB Application No. 2017260.7, 8 pages, dated Mar. 10, 2021.
Extended European Search Report for Application No. GB 21192519. 3, 12 pages, dated Feb. 1, 2022.

* cited by examiner

*Primary Examiner* — Brian P Sweeney
(74) *Attorney, Agent, or Firm* — Nixon & Vanderhye P.C.

(57) ABSTRACT

A computer implemented method of determining a tire pressure is disclosed including the steps of receiving data of a recent stable point comprising both a tire gas pressure and a temperature; receiving data of a desired temperature, at which a current pressure is desired to be determined; and determining the current pressure based on the data of the recent stable point and the desired temperature.

13 Claims, 8 Drawing Sheets

AIRCRAFT SYSTEM AND METHOD FOR DETERMINING CURRENT TIRE PRESSURE

CROSS RELATED APPLICATION

This application claims priority to United Kingdom (GB) Patent Application GB 2017260.7, filed Oct. 30, 2020, the entire content of which is hereby incorporated by reference.

TECHNICAL FIELD

The present invention relates to methods and apparatus for determining tire gas pressure and tire gas temperature.

BACKGROUND

Monitoring of tire inflation pressures is an important part of aircraft maintenance. An underinflated tire is more likely to burst during take-off and/or landing and a tire burst can cause significant damage to surrounding aircraft structures. Tire pressure checks are therefore mandated to be carried out at regular intervals for commercial aircraft.

Current methods of tire pressure checking include manual methods (using a pressure gauge to measure each individual tire manually) and automated methods (interrogating pressure sensors attached to each wheel to measure the associated tire pressure). Regardless of whether the pressure check is manual or automated, a decision on tire pressure maintenance is based on readings of all the tires taken in a single measurement session. For example, with manual measurements each tire pressure is measured in sequence and recorded. With automated measurements each tire pressure may be measured substantially simultaneously or may be measured in sequence.

In order to give a reliable result, tire pressure should be measured when the gas in the tire is at ambient temperature. If the tire is above ambient temperature this will increase the measured pressure, so that a tire requiring maintenance may not be correctly identified. If the tire pressure is measured when "hot" or above ambient temperature, the additional gas temperature above ambient will mean that the pressure is higher so that under-inflation is not detected. It can take a long time for the gas in the tire to reach ambient temperature because it is subject to heating from nearby brake system components, such as brake discs, radiating heat while they cool even though the aircraft is standing. Airbus therefore require waiting at least three hours with the aircraft standing before carrying out a tire pressure measurement.

This three-hour requirement can impose significant operational constraints, especially when turnaround is short, so the opportunity to take a tire pressure measurement may be restricted. For example it may only be possible when the aircraft is not in use overnight and has stood for the required amount of time. A "Hot" tire measurement procedure has been developed which can be used when a tire fault is suspected, to allow tire pressure to be measured less than three hours after the aircraft has been standing. A hot tire measurement process compares relative inflation levels, for example between tires on the same axle or across all main landing gear tires. The use of relative inflation levels can identify a tire which has a low pressure relative to others on the aircraft and which potentially requires maintenance, but cannot be used as a reliable measurement of pressure at ambient temperature.

Automated pressure sensing devices affixed to an aircraft wheel may include a temperature sensor, but this does not measure the gas temperature directly. The nature of fixation to the wheel means that although pressure is sensed directly, temperature is measured indirectly, by a temperature sensor within the sensing device. The temperature sensor is indirectly coupled to the gas in the tire, it therefore cannot be assumed that the temperature measured is the same as the gas temperature in the tire. Furthermore, the relationship between gas temperature and the temperature sensor is complex, impacted by factors such as time for heat to transfer through the wheel and external heat sources, such as cooling brake discs and current weather conditions.

It would be desirable to improve aircraft tire maintenance and/or pressure measurement.

SUMMARY

According to a first aspect of the present invention, there is provided a computer implemented method of determining a tire pressure. The method comprises: receiving data of a recent stable point comprising both a tire gas pressure and a temperature; receiving data of a desired temperature, at which a current pressure is desired to be determined; and determining the current pressure based on the data of the recent stable point and the desired temperature.

Optionally, the method may comprise indicating a maintenance action based on the determined current pressure.

The desired temperature may be a current ambient temperature at the location of the aircraft. The desired temperature may be an expected ambient temperature at a future destination of the aircraft.

The data of the recent stable point may further comprise a time, and the method then further comprises: receiving data of a deflation rate of the tire; and wherein the determining the current pressure is further based on the deflation rate.

According to a second aspect of the invention, there is provided, a computer-implemented method of determining a gas temperature of a tire. The method comprises receiving data of a recent stable point comprising both a tire gas pressure and a temperature; receiving data representative of a current measured gas pressure of the tire; and determining the current gas temperature using the data of the recent stable point and the current measured gas pressure.

Optionally, the method further comprises indicating a safety parameter based on the current gas temperature.

The data of the recent stable point may further comprise a time associated with the recent stable point. The method then further comprises receiving data of a deflation rate; and the determining the current gas temperature is further based on the deflation rate.

Optionally, in either the first or second aspect, data representative of a current measured gas pressure of the tire is received wirelessly.

Optionally, in either the first or second aspect, the recent stable point is less than 24 hours old.

Optionally, in either the first or second aspect, the method comprises: receiving historical data comprising a plurality of tire gas pressure and temperature measurements and an associated time stamp; and determining the recent stable point from the historical data. The historical data may be acquired by measuring the gas pressure and temperature at predetermined intervals.

According to a third aspect of the invention, there is provided an apparatus comprising a processing system configured to implement the method of any of the first or second aspect above.

According to a fourth aspect of the invention, there is provided a computer readable medium comprising instructions that, when executed by a processing system, instruct the processing system to perform a method according to the first or second aspect.

According to a fifth aspect of the invention, there is provided a system comprising: a tire monitoring device comprising a communication interface and configured to measure and store tire gas pressure and temperature at predetermined intervals; and an apparatus comprising a communication interface and a processing system. The processing system is configured to: receive data of the tire gas pressure and temperature from the tire monitoring device using the communication interface; determine a stable point in data; receive data of a desired temperature, at which a current pressure is desired to be determined; and determine the current pressure based on the data of the stable point and the desired temperature.

Further features and advantages of the invention will become apparent from the following description of preferred embodiments of the invention, given by way of example only, which is made with reference to the accompanying drawings.

DETAILED DESCRIPTION

Figure 1:
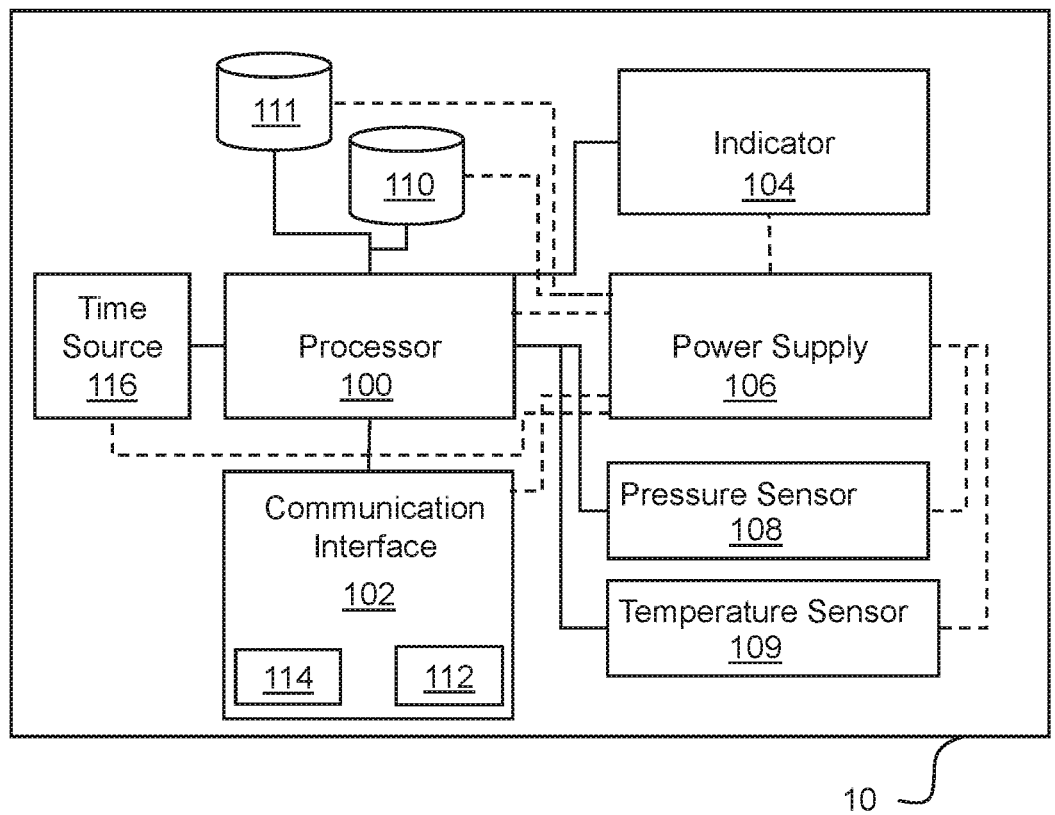
FIG. 1 shows a schematic representation of a tire monitoring device.

It has been found that if a history of tire pressure and temperature measurements is maintained, the historical data can be used to improve the reliability of tire pressure measurement and enable improved tire maintenance.

With the advent of automated, electronic tire monitoring devices which are fixed to an aircraft wheel, measurements of tire pressure can be taken at regular intervals to obtain historical data of pressure without requiring operator input and stored with an associated time of measurement or time stamp. When the tire monitoring device also includes a temperature sensor, temperature data can also be stored along with the pressure data. A history of pressure/temperature pairs with an associated time stamp can therefore be built up over time.

Both pressure and temperature vary dependent on the aircraft's operation including the length of flights, turnaround times, ambient temperature at destinations and weather at destinations. As discussed above, the temperature sensor may not directly measure the gas temperature, so it cannot be assumed that the temperature measured by the temperature sensor is an accurate measurement of the actual gas temperature in the tire. This limits the usefulness of historical data because an aircraft experiences wide variation of temperature in use and measured pressure is dependent on temperature. Analysis of the measured pressure values is of limited value without converting the pressure values to a pressure at a nominal, reference or baseline temperature. However, the inventor has recognized that even indirect measurements of temperature can be assumed to be an accurate measurement once both pressure and temperature have stabilized, as will now be explained in more detail.

Stable points of pressure occur when the temperature of the gas in the tire is changing by a relatively small amount, which is often close to the ambient temperature. This means that sources of heat, such as hot brake discs, have cooled and the temperature of the gas is stable. (Over the short term, such as over 10, 20, 30 minutes or similar, changes in measured pressure are most strongly dependent on temperature.) While stable pressure often occurs at a gas temperature close to ambient temperature, this is not necessarily the case; wind chill and heating from direct sun may have an effect on the gas temperature. So, there can still be uncertainty over the actual gas temperature. It has been recognized that if the temperature measured by the temperature sensor is also stable, then that measurement is a more accurate indicator of gas temperature, even for an indirect measurement of temperature. The tire monitoring device containing the temperature sensor is affixed to the same wheel as the tire so will be exposed to generally the same ambient temperature and external heating or cooling effects as the tire. In the same way that the gas in the tire has stabilized in temperature, so has the temperature of the sensing device. Even though the measurement of temperature using a temperature sensor is an indirect measurement, it is a close approximation of gas temperature at these stable points.

Stable points can be identified from a time series of pressure and temperature measurement pairs by determining data in the time series where both pressure and temperature change by a small amount over a predetermined time. For example, a stable point can be identified or determined when pressure and temperature both vary by less than 5%, less than 4%, less than 3%, less than 2% or less than 1% over a time period such as 10 minutes, 20 minutes or 30 minutes. Such points can then be taken as accurate measurements of both pressure and gas temperature in the tire and used in a variety of ways for tire maintenance and/or monitoring. The variation in temperature is preferably measured with temperature expressed in Kelvin, because although the change is relative (and therefore dimensionless), the different zero point on the Celsius and Fahrenheit scales can act to exaggerate sensitivity to changes close to the zero point. In the Celsius scale in particular, the zero point is close to ambient temperatures in some destinations.

In other examples a stable point can be identified from absolute changes. A stable pressure may be one which varies by less than 5 psi, less than 3 psi or less than 1 psi over a time period of 10 minutes, 20 minutes or 30 minutes. A stable temperature may be one which varies by less than 5° C., less than 3° C. or less than 1° C. over a time period of 10 minutes, 20 minutes or 30 minutes.

In further examples, a stable point may be identified by a substantially similar rate of change in pressure and a substantially similar rate of change in temperature at the start and end of a predetermined period of time. The period of time may be 5 minutes, 10 minutes, 20 minutes or 30 minutes. A substantially similar rate of change in both temperature and pressure suggests that the temperature measurement is accurately tracking the pressure measurement so even though the change in absolute values over the time period may be large, the temperature can nevertheless be taken as an accurate representation of the gas temperature in the tire. More specifically, if the gradient of pressure against time is less than 1%, less than 3% or less than 5% different at the start and end of the predetermined period of time; and if the gradient of temperature against time is less than 1%, less than 3% or less than 5% different at the start and end of the predetermined period of time then that period of time may be identified as containing a stable point.

It is a characteristic of such stable points that the measured quantity is not changing significantly over time, so that a high frequency of measurement is not required; a stable point will be one where the change is small over a matter of minutes. However, there is also a maximum limit for the time interval used to assess stable points. If the gap between measurements is too long, it may be hard to identify stable points due to changes in the ambient temperature or a stable point may be mistakenly identified despite intervening fluctuations in temperature. For example, if the length of time between measurements is 2 hours this may be long enough for changes in ambient temperature during the day to create enough change in temperature that a stable point is not identified. Equally, a time between measurements of 2 hours may be enough that a short haul flight cycle causes the measurements to appear stable when in fact there is significant variation. In both cases a shorter time between measurements, such as every 10 minutes, every 20 minutes or every 30 minutes can enable a stable point to be determined more reliably.

Once a set of stable pressure and temperature points has been identified, pressure trends in the tire can be identified and used to monitor and/or maintain the tire.

The pressure and temperature data can be stored in memory of the individual sensors themselves or elsewhere, for example in a central system within the aircraft itself or remote from the aircraft, such as a cockpit system or at a maintenance facility. While there may be constraints on the amount of memory which can integrated into the sensors themselves, so that it limits the amount of data that can be retained, transferring the data and storing it elsewhere may enable long histories of measurement data to be stored. For example, a central system may have effectively unlimited data storage for pressure and temperature pairs so that measurement data may be maintained for the entire tire service life. Such a system can also maintain data that persists across physical changes to the tire, such as retreading (also referred to as remolding).

As a further benefit, through the use of an automated sensor to take the measurements, data can be obtained automatically, without additional labor required from maintenance staff.

Measurement data may initially be stored in the tire monitoring device itself, in a central system which is part of aircraft, or both. This measurement data may be transferred to another device or system at times when a tire pressure measurement takes place, for example when a mandated tire pressure check takes place.

Once determined, the stable pressure measurements may be converted or normalized to a pressure at a same predetermined temperature so that they can be directly compared. For example, the pressure may be converted to a normalized pressure at 15° C. This can be done in several ways. One way is to use a known relation of how much pressure changes following a change in temperature, such as a 10° C. change in temperature changes pressure by 3.7%. Another way is to apply the Ideal Gas Law. Using a known relation may be computationally simpler, while applying the Ideal Gas Law may be more accurate. In both cases, some assumptions about the behavior of the tire and gas inside it are made. These may include that the gas is an ideal gas and that the volume of the tire does not change. Aircraft tires are filled with Nitrogen, which can be considered to behave as an ideal gas over the operating pressure and temperature ranges experienced by aircraft tires. An aircraft tire is inflated to relatively high pressure, typically 200 psi (1379 kPa/13.79 Bar) and the construction of tire means that volume change is minimal over the tire's operating pressure range.

Further assumptions or variables may also be considered, such as whether the tire is loaded or unloaded (measurement during flight will be unloaded, for example). This may dependent on the specific aircraft and tire configuration. For example, it has been suggested that the difference in measured pressure between an unloaded tire and loaded tire is 4%, while other tests carried out on an Airbus A380 suggested that there is little measurable change in tire pressure between loaded and unloaded states. The impact of tire loading on pressure may therefore depend on particular aircraft model or particular combinations, such as of two or more of aircraft model, wheel configuration and tire model. If tire loading is considered to adjust the pressure measurements, then those periods where a tire is unloaded can be identified from trends in the historical data and the measurements adjusted depending on the loading state of the tire. For example, the historical data may be examined for a relatively steep upward gradient in the pressure or temperature measurement followed by cooling. Such steep upward gradients generally correspond to a landing events so the loading state can be changed to loaded. Similarly, the low temperature when flying at cruising altitudes can allow flight periods to be identified, through absolute temperature or by a relatively steep downward gradient in the temperature or pressure measurements. Take off events may be identified by a relatively small absolute increase in pressure or temperature, or a relatively shallow upward gradient in pressure and temperature, followed by cooling.

The methods and applications discussed herein can be applied to any aircraft using tire monitoring devices that can be instructed to measure pressure and temperature at regular intervals and cause those measurements to be stored with an associated timestamp. An example tire monitoring device is shown in schematic format in FIG. 1.

FIG. 1 shows a schematic representation of a tire sensing device or tire monitoring device 10 for use with the methods and applications described herein. The tire monitoring device 10 is configured for mounting on a wheel, for example by a mechanical connection to an opening on the wheel providing access to the tire. The tire monitoring device 10 includes a processor 100, a communication interface 102, an indicator 104, a power supply 106, a pressure sensor 108, a temperature sensor 109, a first storage 110, a second storage 111 and a time source 116.

Processor 100 may be any suitable processing device including a microprocessor with one or more processing cores. In use, processor 100 coordinates and controls the other components and may be operative to read and/or write computer program instructions and data from/to the storage 110, 111.

Communication interface 102 is connected to the processor 100 and is used to both transmit and receive data from the other devices within a tire pressure sensor system. In this example, the communication interface is a wireless communication interface including two transceivers, 112, 114 which both use different wireless technology. A first transceiver 112 is provided for relatively long-range communication, up to about 50 m or about 100 m. For example, the first transceiver may use a communication standard suitable for mobile devices, such as IEEE 802.15.1, IEEE 802.15.4, IEEE 802.11 (Wi-Fi) on either the 2.4 GHz or 5 GHz Industrial Scientific and Medical (ISM) bands or a Wireless Avionics Intra-Communications (WAIC) standard. The first transceiver also includes an encryption module for encrypting sent data and decrypting received data, for example according to the Advanced Encryption Standard (AES) utilizing pre-shared keys. A second transceiver 114 is provided for relatively short-range communications. For example, the second transceiver 114 may use a standard according to IEEE 802.15, such as IEEE 802.15.4, RFID or Near Field Communication (NFC). The second transceiver may operate over a range of less than 5 m, less than 3 m, less than 1 m, less than 50 cm, less than 25 cm, less than 10 cm, less than 5 cm, less than 1 cm or requiring contact between devices. Like the first transceiver 112, the second transceiver 114 also includes an encryption module for encrypting sent data and decrypting received data.

In some examples, a single wireless transceiver may be provided in the wireless communication interface. In that case the single transceiver may use relatively short range or relatively long range communication, or adjust the range (such as by controlling transmit power) as required.

Indicator 104 is connected to the processor 100 and controlled by the processor 100 to provide indications to a user of the tire pressure sensor system. In this example the indicator is an LED, but in other examples the indicator is another form of light, a display, such as an LCD or e-ink display, or any other form of visual indication. In other examples, the indicator is an audible indicator, such as a buzzer, beeper, speaker or any other sound generating component. In further examples, the indicator can comprise both audible and visual indication components. The indicator provides at least first and second indications, for example a first color and a second color of emitted light. Further indications can also be provided, such as solid or flashing light. The tire monitoring device has a housing (not shown) and the indicator 104 can provide an indication outside the housing, for example the LED may be mounted external to the housing or visible through the housing, or sound may be able to be emitted from within the housing.

The power supply 106 provides power to the elements of the sensing device. It may be a battery, such as Lithium battery. In this example, the power supply is a Lithium battery with power sufficient to run the sensor in normal operation for several years, such as 2 to 3 years. In other examples the power supply may comprise a power harvesting system, for example harvesting vibration and/or electromagnetic radiation to charge a capacitor or battery which is then used to power the device.

In use, the tire monitoring device may spend much of its operational life in "sleep" or low power mode, with most of the components other than the processor and wireless communication interface powered off. This can conserve battery life. For example, the tire monitoring device may be by default in a low power mode, listening for a command to measure or report tire pressure. While in this low power mode the tire monitoring device can be scheduled or otherwise caused to wake up at predetermined intervals or times, sense pressure and temperature and store the results. For example, pressure and temperature may be sensed every minute, every 5 minutes, every 10 minutes, every 15 minutes, every 20 minutes, every 30 minutes, every hour or every 2 hours and stored for use in trend monitoring. It has been found that a measurement every 10 minutes provides a good balance between conserving power and providing useful data for historical trend monitoring.

The pressure sensor 108 is connected to processor 100 and may be any suitable sensor for measuring pressure, for example a capacitive sensor. Similarly, the temperature sensor 109 is connected to processor 100 and may be any suitable sensor for measuring temperature, such as thermocouple. The temperature sensor 109 is arranged to measure the temperature of the gas inside the tire indirectly, by measuring a temperature associated with part of the sensing device which is thermally coupled with the gas through the connection to the wheel.

The connection of the pressure sensor 108 and temperature sensor 109 to the processor 100 may be digital, providing a digital representation of the measured pressure and/or temperature from an Analogue to Digital Convertor (ADC) in the sensor itself, or analogue, in which case the processor may include an ADC to sample the received signal. Including both a pressure sensor and a temperature may be useful to determine a temperature compensated pressure value.

This example includes two storage elements 110 and 111. Storage 110 is non-volatile rewritable storage in this example, such as flash memory which can retain data without requiring applied power. Other examples may include volatile storage, which is kept powered by the power supply, or combinations of read-only and rewritable storage. Storage 110 is connected to the processor 100 and used to store both computer program instructions for execution by the processor and data, such as data from the pressure sensor 108 or data received over the wireless communication interface 102. Storage 110 is therefore configured to store a history of pressure and/or temperature readings sensed by the pressure sensor 108 and the temperature sensor 109. The history may be stored for at least the maximum time between a pressure measurement for tire maintenance, such as for at least three days. This can ensure that enough history is held to provide details since the last maintenance tire pressure reading, so that the history can be transferred for use in trend analysis, along with the current pressure measurement data. In other examples, longer periods of history may also be kept. For example, the previous ten days readings may be stored, with the newest data replacing the oldest once the storage is full, such as using a FIFO structure or similar.

Storage 111 is secure storage to which write and/or read access is restricted, for example only accessible to certain processes running on processor 100. Configuration data, such as wireless encryption keys can be stored in storage 111. In other examples, a single storage may be provided, or storage 110 and 111 may be provided in a single physical device with a logical partitioning between storage 110 and storage 111.

The tire monitoring device 10 also comprises a time source 116, such as a counter or a real time clock. The time source provides a value indicative of current time for indicating the time at which a measurement was taken, for example the processor 100 may cause a current value of the time source to be associated with each pressure and temperature measurement when it is stored in the storage for use as a timestamp.

A timestamp may be an indication of real time (such as Coordinated Universal Time, UTC). A timestamp may also be a relative measurement, such as a counter value where the counter is initialized at a point in the use of the tire monitoring device, such as when the tire monitoring device is first put into service. Where relative timestamps are used, they may be converted to a real time by noting the value of the timestamp for a known time and considering the interval at which the counter is incremented.

It is not required for the time source 116 to be synchronized with other tire monitoring devices on the same aircraft because the methods using historical data described herein can be applied to the data of each monitoring device independently. When data of more than one tire monitoring device is required to be viewed on a common timeline timestamps can be converted to a common reference timeline. For example the current time when a mandated tire pressure measurement takes place may be recorded along with a corresponding value of the timestamp and used to convert.

Figure 2:
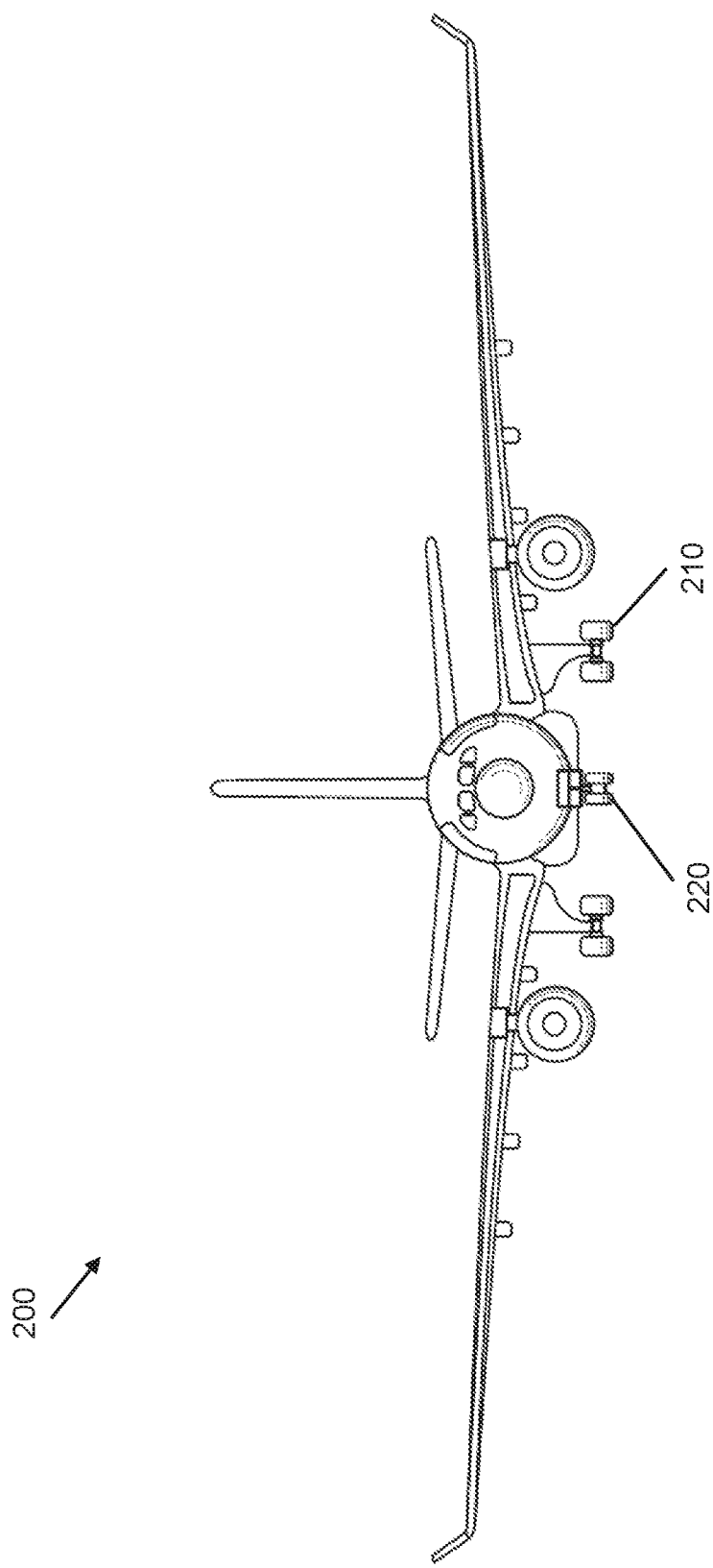
FIG. 2 shows a diagrammatic representation of an aircraft.

A tire monitoring device 10 is provided on each wheel of an aircraft. An example aircraft 200 is depicted in FIG. 2, which is a diagrammatic representation of a front view of an Airbus A320 aircraft. The aircraft has six wheels in total; four wheels as part of the main landing gear 210 and two wheels as part of the nose landing gear 220. The aircraft 200 therefore has six tire monitoring devices. Other models of aircraft may have different numbers of wheels and hence different numbers of tire monitoring devices. An Airbus A380 has twenty-two wheels and so will have twenty-two tire monitoring devices, for example.

In one example, the aircraft may include a tire monitoring system which is integrated with a central system of the aircraft, so that the tire monitoring devices themselves are in communication with the central system. For example, the aircraft may be provided with a monitoring system which is accessible through an interface in the cockpit of the aircraft and/or through a separate maintenance system when on the ground. An example of an aircraft with a central system for tire monitoring is the Airbus A380.

In another example, the tire monitoring system may be a standalone system of tire monitoring devices which operate independently from other aircraft systems. Such a system may be provided on an aircraft from new or retrofitted to add functionality to an existing aircraft. An example of such a system is described in EP-3 498 501A1, incorporated herein by reference for all purposes.

Figure 3:
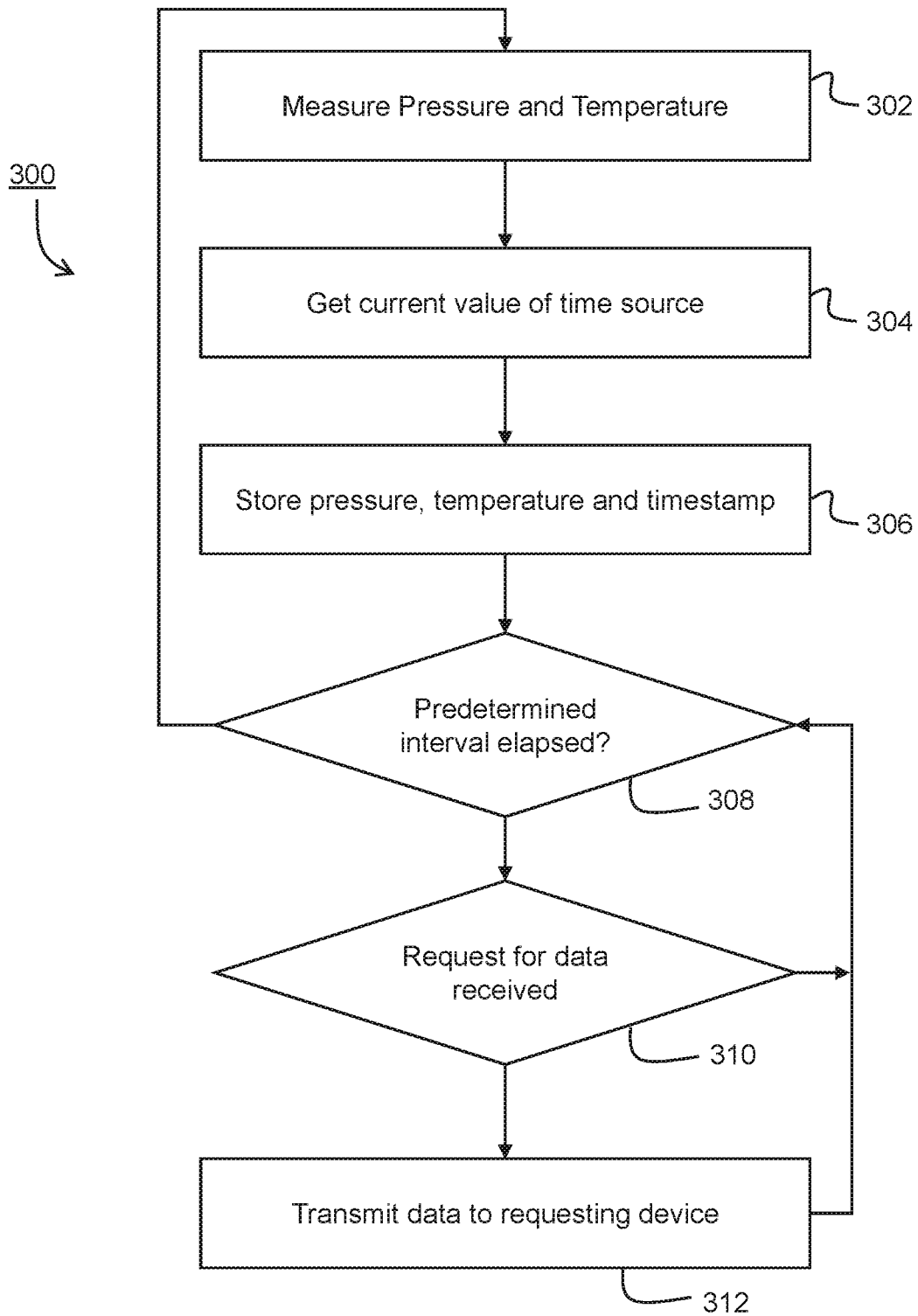
FIG. 3 is a flow chart of an example method for a tire monitoring device to store a history of temperature and pressure measurements.

FIG. 3 depicts a method 300 which can be implemented by a tire monitoring device 10 in order to store a history of temperature and pressure measurements. First, at block 302, the device 10 measures both the pressure and temperature using the pressure sensor and the temperature sensor. The current time is read from the time source at block 304. Next, at block 306, the pressure and temperature measurements are stored in the storage along with an associated timestamp based on the time read from the time source. A single data structure may be used to hold the pressure, temperature and timestamp; the pressure and timestamp may be stored in a separate data structure from the temperature and timestamp; or the pressure, temperature and timestamp may be all be stored separately and associated by common key such as an index number. A single data structure may reduce storage requirements, but separate data structures may allow more flexibility.

Pressure can be stored in any suitable unit, such as psi, atm, or kPa. Likewise, temperature can be stored in any suitable unit, such as ° C. or K. The timestamp can be a value of the time source or expressed relative to a real time base, such as UTC.

The blocks 302, 304 and 306 are repeated at predetermined intervals. The predetermined interval may be governed by a querying a timer, scheduling at an interrupt at an appropriate time interval and any other suitable method. The predetermined interval can be regular, for example taking a measurement once every 1, 5, 10, 15, 20 or 30 minutes. A measurement every 10 minutes has been found to present a good balance between power saving and gathering enough historical data to allow useful analysis. As depicted in FIG. 3, at block 308 it is determined whether a predetermined time interval has elapsed. If it has the method proceeds to block 302 to take another measurement, if it has not the method proceeds to block 310.

The tire monitoring device can provide a plurality of the stored data to a requesting device in response to a request from another device, such as a maintenance device or a central maintenance system. In the method of FIG. 3, at block 310, while waiting for the next measurement task, the tire monitoring device can monitor for a received request over the communication interface and provide a response, such as by determining if a request for historical data has been received at block 310. If a request has been received, execution proceeds to block 312, otherwise execution returns to block 308.

At block 312, at least a portion of the stored data is provided to the requesting device using the communication interface. For example, the request may specify a required time period for the data or the device may transmit the most recent data for a predetermined period, such for the last day, the last 3 days or the last 10 days. In other examples all the data in the storage is provided to the requesting device.

According to the method of FIG. 3, tire monitoring devices can measure and store data on pressure and temperature over time and provide it to a requesting device. While FIG. 3 has described the use of logical tests at blocks 308 and 310, other examples may use an event-driven structure.

In examples where the tire monitoring device is in communication with a central system of the aircraft, each measurement may be transmitted to the central for storage as they are taken, alternatively or additionally to sending data in response to a request in blocks 310 and 312.

Figure 4:
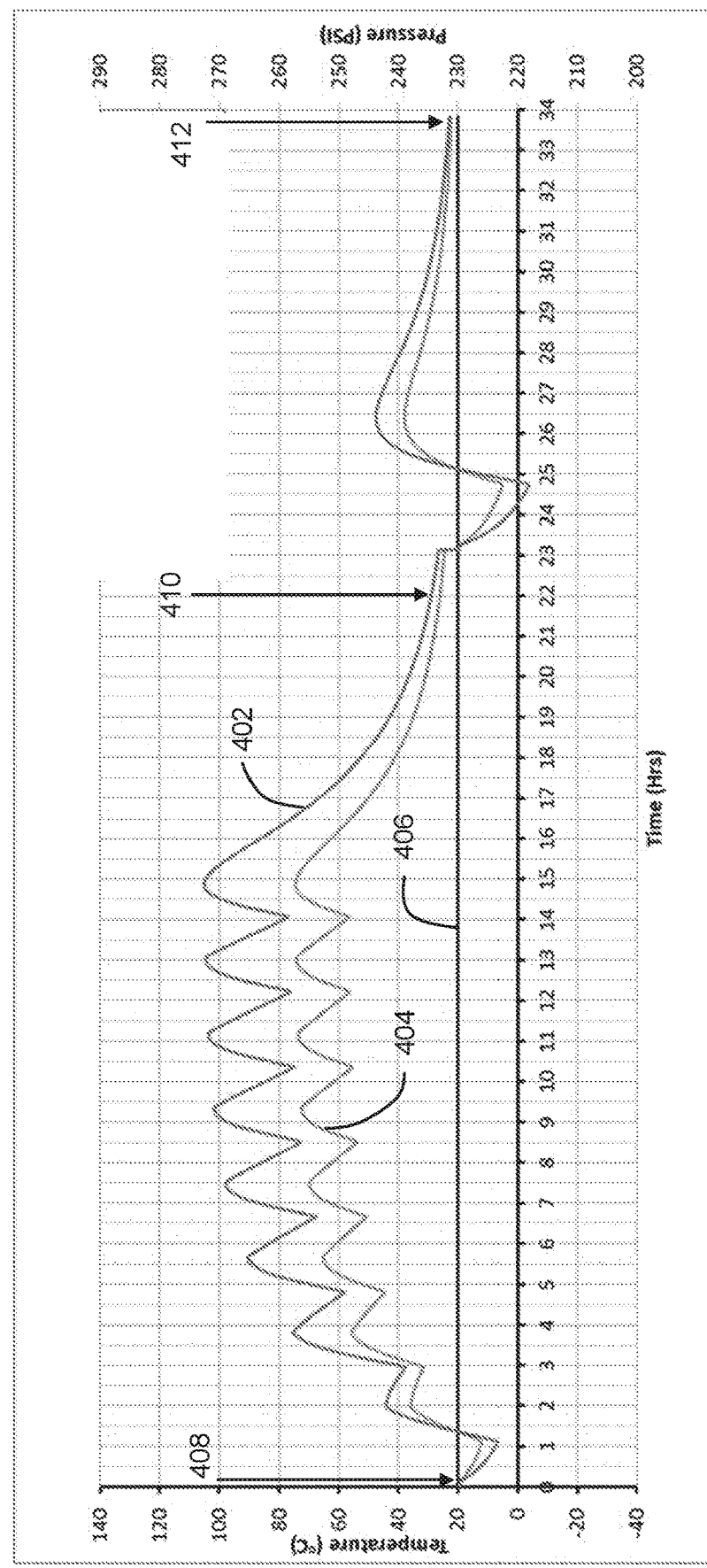
FIG. 4 shows simulated tire pressure and tire gas temperature data against time during operation of an aircraft.

Example data that may be collected by a tire monitoring device as discussed above with reference to FIG. 1 is depicted in the graph of FIG. 4. FIG. 4 depicts simulated pressure and temperature data for an aircraft which carries out eight 1-hour flights on a first day followed by a single 90-minute flight the next day. FIG. 4 depicts the variation in Tire gas pressure 402 (the right-hand axis), Tire gas temperature 404 (left-hand axis) and ambient temperature at ground level 406 (left-hand axis) against time. The simulated data is from a 2-Dimensional Computational Fluid Dynamics (CFD) model of the Wheel, Tire and Brake (WTB). The model is an axisymmetric conjugate heat transfer model which calculates the temperature of all solid and fluid components.

Referring to FIG. 4, the aircraft begins at time=0 hours with pressure and temperature both equal to ambient (20° C./293 K). During the first flight cycle, the low temperature at altitude causes pressure and temperature to drop until the aircraft lands. Landing introduces heat to the tires from several sources, including from the increased temperature at ground level, flexure of the tire on landing and heat radiated from components of the brake system, such as brake discs. The tires continue to heat while the aircraft is standing, for example the brakes radiate heat, warming the gas in the tire, and continue to increase the heat of the gas in the tire for the relatively short time—1 hour—that the aircraft is standing. After take-off the lower temperature at altitude causes cooling, as can be seen for the period from 2 to 3 hours. Landing again causes a heat input and a heating period occurs from time 3 to 4 hours until the aircraft takes off again. The cycle continues until the aircraft ceases operations and stands overnight, from time=14 hours to time=23 hours. During this standing period the pressure and temperature rise to a peak at time 15 hours and then slowly reduce towards ambient. The 90 minute flight between time=23 hours and time=25 hours further cools the tire before temperature rises on landing. Finally, the temperature and pressure again rise to a peak and the reduce towards ambient as the aircraft stands.

The graphs in FIG. 4 show how difficult it is to measure tire pressures reliably for a commercial aircraft because they are constantly changing. In order to ensure that the gas temperature in the tire is close to ambient for an accurate pressure reading, at least a three-hour standing time before taking a pressure measurement is currently mandated, but such a period is not available for much of the day. Even after a three hour standing period, such as can be seen in FIG. 4 from time=14 to 17 hours, tire gas temperature is still around 30° C. above ambient even after three hours standing.

Furthermore, FIG. 4 depicts the actual simulated gas temperature, this is not necessarily the temperature that is measured when the temperature is sensed indirectly as is the case for automated tire monitoring devices. The indirect measurement means that accurate measurement of gas temperature can only be obtained at certain times because the indirect temperature measurement can lead or lag that of the gas in the tire.

It has been found that despite the significant variations during an aircraft operating cycle, historical data of pressure and temperature measurements can be used to improve tire maintenance. By determining stable points in the data, at those stable points the measured temperature is a good representation of the gas temperature, despite the indirect measurement. For example, a stable point may be where the pressure and temperature, in K, both change by less than 2% over a 10 or 20 minute period. This is because the stable nature of the point means that the system is tending towards an equilibrium state where the temperature of all the components of the wheel system is generally the same, so that the indirect measurement is close to the actual gas temperature. Stable points exist in FIG. 4 at the times 0 hours (indicated by arrow 408), 23 hours (indicated by arrow 410) and 34 hours (indicated by arrow 412) for example. These can then be used to determine pressure trends without the influence of the aircraft operating cycle, as will now be described.

Figure 5:
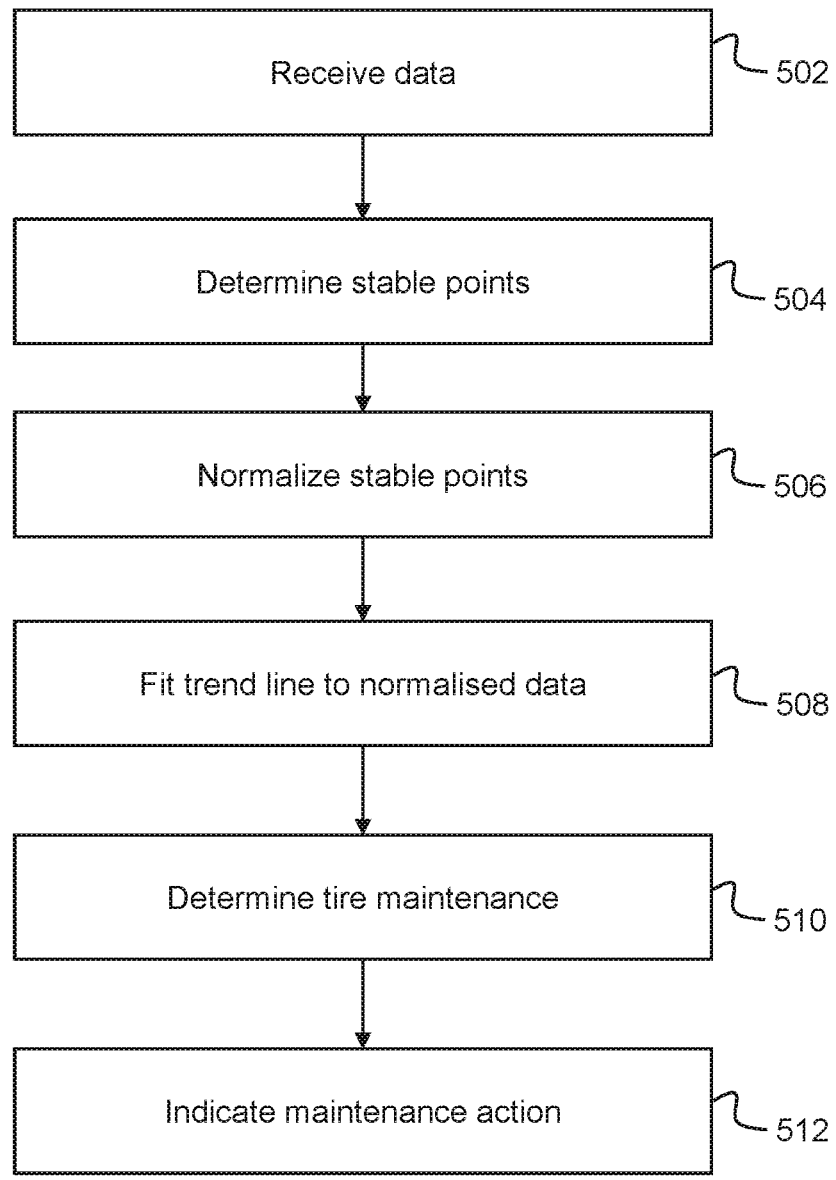
FIG. 5 is a flow chart of an example method for tire maintenance using historical data.

An example computer-implemented method for tire maintenance using historical data that can be executed by a processing system is depicted in FIG. 5. First, at block 502, the data of pressure and temperature measurements and an associated timestamp is received. The data may be retrieved from a storage device or requested from a tire monitoring device, for example.

Next, at block 504, stable points are determined. In this example, the stable points are determined by stepping through the dataset and considering each pair of consecutive data to establish the relative change in both pressure (expressed in psi, kPa or Bar) and temperature (expressed in K). If the change in both is less than 2% then the pair of points are recorded as a stable point. Stable points may be saved in a separate dataset or otherwise marked as stable, for example by setting a flag associated with those data points in the data set. In other examples stable points may be identified by looking for a constant rate of change, such as by determining that the gradient of both pressure and temperature is within 2% for a consecutive pair of data points.

Once the stable points have been identified, the data is normalized at block 506 to express the pressure measurement at a predetermined reference temperature so that the pressure data is directly comparable. For example, a reference temperature of 15° C. (288 K) may be used. This normalization can use any suitable technique. For an aircraft tire, which is filled with nitrogen to pressures around 200 psi (1,380 kPa/13.8 bar), it can be assumed that the gas in the tire behaves as an ideal gas, and that the tire volume is constant. With these assumptions a relation can be used to normalize the pressures, for example that a change of 10 K in temperature corresponds to a 3.7% change in the pressure. Alternatively, with the assumption of an ideal gas and constant volume, the pressure may be converted using the Ideal Gas law as follows:

$$P_{end} = \frac{P_{start}T_{end}}{T_{start}} \quad (1)$$

Where $P_{end}$ is the pressure expressed at the desired temperature, such as a reference temperature, $P_{start}$ is the measured pressure, Tend is the desired end temperature in K and $T_{start}$ is the measured temperature in K.

This normalized data can then be used to fit a trend line to the pressure over time at block 508, for example using linear regression with least squares. The least squares method is computationally simple and works well in this application because pressure loss from a tire can be assumed to be a straight line between reinflation events. (A straight line approximation is reasonable because the overall pressure change is small; a tire will be re-inflated when it is at lower than 100% of its normal operating pressure). Other examples may use other methods to determine the trend line, including fitting a curve or polynomial rather than a straight line.

Figure 6:
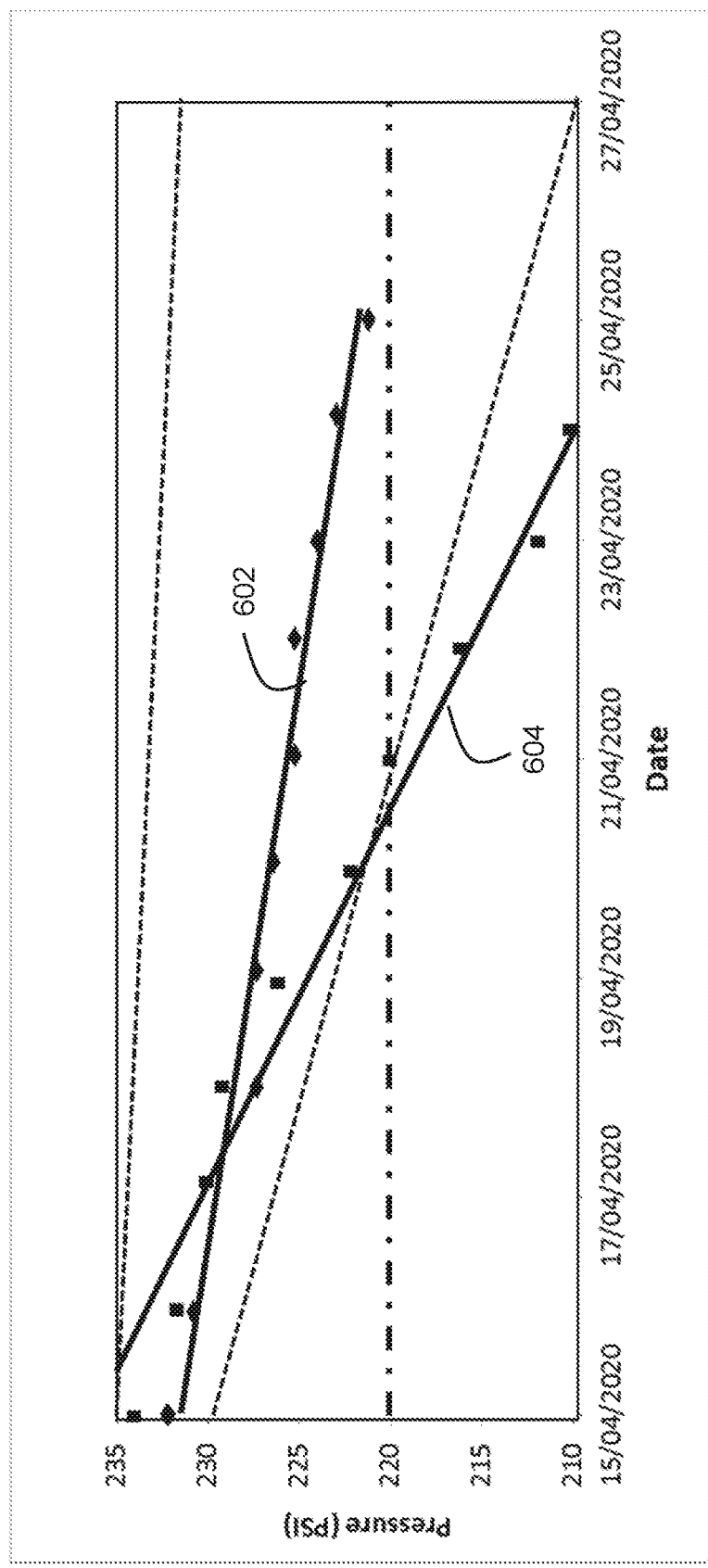
FIG. 6 depicts example pressure trend lines against time.

FIG. 6 shows some example trend lines that might result once the stable points have been identified, normalized and a trend line fitted to them (the data here is illustrative and not based on test results). A first trend line 602 is the trend for a tire on a first wheel and a second trend line 604 is the trend for a tire on a second wheel. It can be seen clearly that the deflation rate for the second wheel is faster than that of the first wheel.

Returning to FIG. 5, at block 510, any tire maintenance requirements are determined. This determination may use the stable data itself, for example making a tire maintenance determination based on the absolute or normalized values. The determination may also use the trend line, which can be indicative of tire health and whether maintenance is required In one example, if the deflation rate indicated by the trend line is greater than a predetermined threshold, such as 5% a day, a maintenance action can be indicated. A deflation rate exceeding a threshold is indicative of a tire fault, but might not be identified from the existing single measurements—the pressure itself may be acceptable but the historical trend shows that deflation is high and the tire and/or wheel should be replaced.

In another example, if the trend line indicates inflation over time, without a corresponding inflation event, a maintenance action can be indicated. Inflation over time cannot occur without an inflation event so this indicates a fault in the tire monitoring device, which should be replaced.

In other examples, the trend line can be used to predict a pressure of the tire at a point in the future and potentially indicate a maintenance action. While the current pressure may be within acceptable limits, so that no action is required at the current time, the trend line can be used to predict the pressure at a future time, such as the time of the next tire pressure check. The next tire pressure check can be determined based on the mandated maximum time between tire pressure checks. An example of a mandated maximum time between tire pressure checks is the interval defined in the Maintenance Planning Documents (MPD) for the aircraft, such as 3 days for a single aisle aircraft such as the Airbus A318, A319, A320, A321 and 48 hours for other aircraft, such as the A380 and A350. Some operators may choose to adopt a shorter time between tire pressure checks than that defined in the MPD, so alternative time periods may be used instead in some examples. In other examples a specific time period to look ahead, or a specific date and time in the future may be received as an input to predict the pressure.

If the predicted pressure at the time in the future, for example the time of the next tire pressure check as required in the MPD, is below acceptable limits a maintenance action can be indicated at the current time, rather than waiting for the next measurement. In this way tires can be maintained more proactively and wear due to underinflation minimized, potentially improving safety and/or tire lifetimes.

Regardless of what maintenance action is indicated, the maintenance action can be indicated at block 512 in any suitable way. For example, a user interface may indicate a need to take a maintenance action. The user interface could be provided as part of a cockpit information system or a separate maintenance device. Providing the indication on a separate maintenance device is useful when the maintainer is carrying out a tire pressure check, for example. Providing the indication on a cockpit system is useful as part of pre-flight checks, for example (as the system uses historical data, analyzing the historical data could form part of a pre-flight check to enhance safety, for example).

In some examples, additionally or alternatively to indicating a maintenance action, a maintenance action may be caused based on the trend line. For example, a nitrogen cart may be dispatched to the aircraft to be used for reinflation, or a tire replacement scheduled.

The method of FIG. 5 could be carried out by any suitable processing system, including the tire monitoring devices themselves. In some examples, the method of FIG. 5 is carried out a central maintenance facility, such as one maintained by an aircraft manufacturer or airline operator or a specialist service contractor. The central system may be sent the data via a computer network responsive to a tire pressure measurement check taking place. This may be beneficial to allow a wider view of tire performance across a fleet to be analyzed. Scheduling maintenance in response to the historical data is also improved when carried out by a central maintenance system because it can take expected destinations into account. If reinflation in the future is predicted, a central maintenance facility could schedule the reinflation for when the aircraft is next at a destination with suitable facilities but still before the pressure is predicted to fall too low, improving maintenance.

The identification of stable points from historical data of tire gas pressure and temperature enables new methods of determining tire pressure and/or temperature to be implemented which are advantageous over existing methods. As will be explained in more detail below, information of a recent stable point from the historical data (i) enables tire gas temperature to be determined from a current pressure measurement, so that the temperature itself is not required to be measured and/or (ii) enables current tire gas pressure to be determined at any desired temperature using the recent stable point, without needing to allow a specified standing time beforehand.

Once historical data has been analyzed to identify the stable points, those stable points can be assumed to be an accurate measure of both tire gas pressure and tire gas temperature at that time, even if the temperature is measured indirectly through a temperature sensor coupled to, but not directly in contact with, the gas in the tire. It has been explained above how a nitrogen filled aircraft tire can be assumed to obey the ideal gas law and to have a constant volume. It can also be assumed that the deflation rate of an aircraft tire is relatively low, because the leakage is required under international standards to be a maximum of 5% in 24 hours. (This is defined in ETSO-C62c, European Technical Standard Order Subject: Aircraft Tires, and ETSO-C135a, European Technical Standard Order Subject: Large Aeroplane Wheels and Wheel and Brake Assemblies.) A stricter leakage rate criterion may also be applied by operators and/or manufacturers, for example Airbus allows a maximum leakage of 2% in 24 hours. Thus deflation may be assumed to be less than 2% a day.

With that assumption, data of a recent stable point can be transformed to establish pressure at a desired temperature, or can be used in conjunction with a measured current pressure to determine the current tire gas temperature as will now be explained in more detail.

A recent stable point may be the stable point identified in the historical data that is closest to the present time, so that any impact from deflation is minimized A recent stable point can also be another of the stable points, for example one where the temperature is determined as closest to the ambient temperature. Such a point may be more accurate because the system is likely to be in thermal equilibrium with the surroundings at ambient temperature. To ensure that that the assumption of no deflation holds true, regardless of how the recent stable point is selected, the recent stable point may be less 72 hours old, less than 48 hours old or less than 24 hours old.

With these assumptions and the Ideal gas equation then either a pressure or a temperature can be determined using the relation:

$$\frac{P_1}{T_1} = \frac{P_2}{T_2} \tag{2}$$

where $P_1$ is the gas pressure at the recent stable point in Pa, $T_1$ is the gas temperature at the recent stable point in K, $P_2$ is either (i) the current measured gas temperature when it is desired to determine the current gas temperature $T_2$ or (ii) the pressure to be determined at a specified different temperature, $T_2$.

More specifically, the current gas temperature $T_{current}$, in K, can be determined from a current measured pressure $P_{current}$, and the pressure, $P_{stable}$, and temperature, $T_{stable}$, at the recent stable point by:

$$T_{current} = \frac{P_{current} T_{stable}}{P_{stable}} \tag{3}$$

Likewise, the pressure $P_{unknown}$, at a desired or otherwise defined temperature $T_{desired}$ in K, can be determined from the pressure, $P_{stable}$, and temperature, $T_{stable}$, at the recent stable point by:

$$P_{unknown} = \frac{P_{stable} T_{desired}}{T_{stable}} \quad (4)$$

In other examples a known relation between pressure and temperature is used, for example that a 3.7% change in pressure occurs every 10° C. change in temperature as discussed above.

The determination of pressure and temperature can be combined to enable a current measured pressure to be expressed at any desired temperature, when starting from a stable point. First the gas temperature is determined from equation (3) and then equation (4) can be used to transform the measured pressure to a desired temperature, using the measured pressure and determined temperature in place of the stable point.

Figure 7:
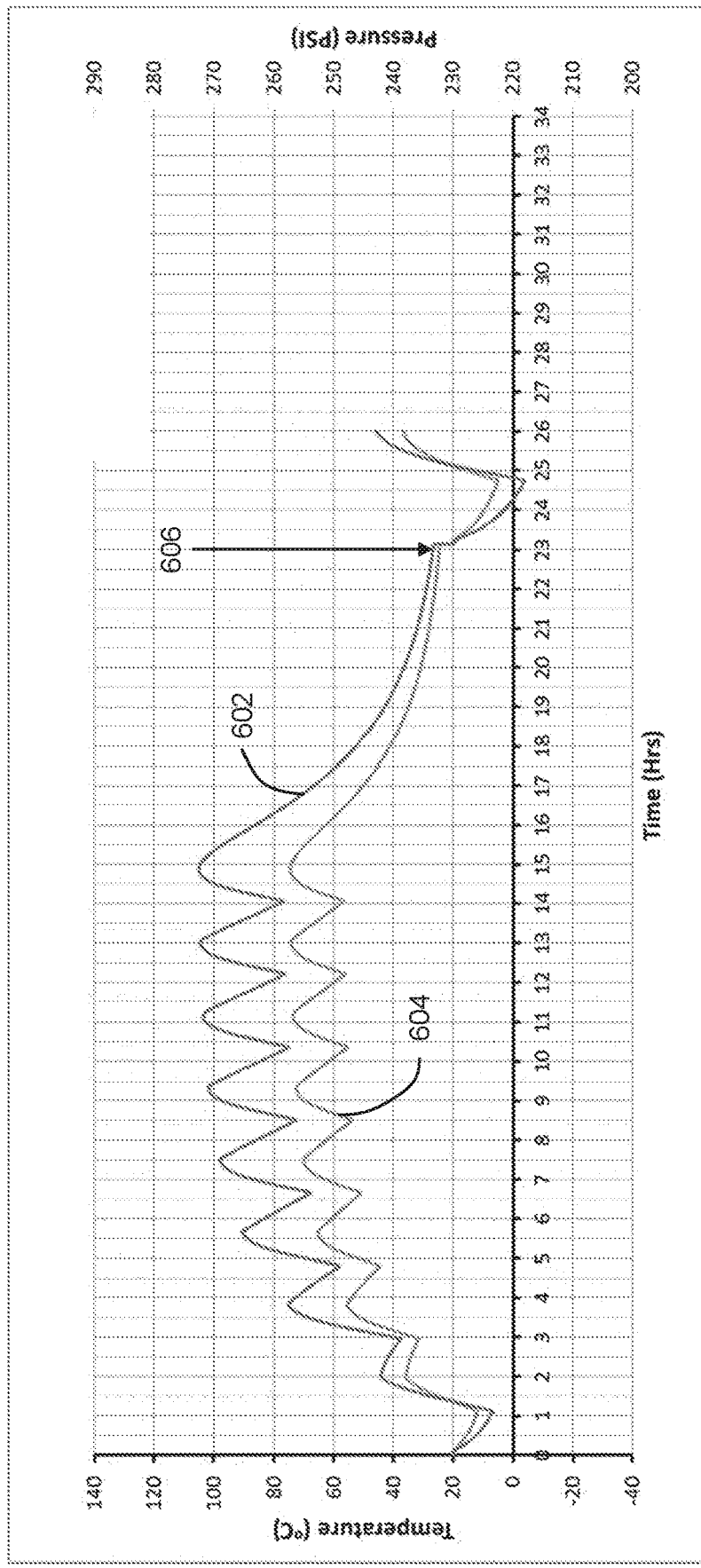
FIG. 7 depicts simulated tire pressure and tire gas temperature data against time during operation of an aircraft where pressure or temperature is desired to be determined before an aircraft has been standing for a predetermined period of time.

FIG. 7 depicts how determining pressure from a recent stable point can enable tire pressure to be estimated when the tires are "hot", i.e. above ambient temperature. FIG. 7 includes the same simulated flight cycle data as FIG. 4, with measured pressure 602 and measured temperature 604. In the situation depicted in FIG. 7, it is desired to know the pressure once the tire has cooled to ambient temperature soon after the landing, at time=26 hours or around 1.25 hours after landing, while the tire is still hot. This is not possible with conventional manual or automated tire pressure measurement. As can be seen, the actual pressure and temperature at that time are still rising as heat diffuses into the tire gas from the other components of the system and at least a further 1.75 hours must elapse before a pressure reading can be taken (the mandated 3 hours standing time, assuming minimal taxi time). While "hot" measurement processes can be used to identify a clear fault by relative comparison of pressure, these do not result in a reliable measurement of the inflation pressure once the tire has cooled to ambient. In other words existing "hot" measurement processes cannot express the pressure at an ambient temperature. Even though an automated tire monitoring device can include a temperature sensor, because this is coupled indirectly to the tire gas, the measured temperature is not reliable at this point in a flight cycle as the pressure and temperature are not stable.

By using the historical data of pressure and temperature, the tire pressure can be determined at time=26 hours despite the tire being hot. The historical data enables a stable point to be identified at point 606 as explained above for FIG. 4. This stable point is used to determine the pressure at the ambient temperature at the destination. The ambient temperature can be a received input, such as from a local weather station or from an operator, or retrieved from a source of weather information, such as a network connected weather data source. Pressure at the ambient temperature is determined from the pressure at the stable point using equation (4) above or a known relation between temperature and pressure. Just 3 hours have elapsed since the stable point in this case, so the deflation can reasonably be assumed to be minimal and the pressure can be determined much sooner than is usually possible. The historical data is recorded throughout the operation of the aircraft so is available without requiring manual interaction. In addition, use of tire monitoring device already affixed to the wheel enables the data to be received from a safe operating distance while components, such as brake discs may still be too hot from landing to allow a safe approach by personnel.

A further benefit is that this method can be more accurate than prior methods based on waiting a set time, such as 3 hours, before carrying out a measurement. As can be seen from FIG. 4, even after waiting 3 hours from landing, at time=28 hours, the gas pressure and temperature in the tire have still not stabilized or reached ambient temperature. A measurement even after 3 hours standing may be less accurate than using the last stable point. As can be seen in FIG. 4, it is not until time=34 hours, a total of 9 hours standing, that the pressure and temperature are close to ambient for an accurate reading to be taken directly.

Once the pressure has been determined a maintenance action may be indicated, for example is the pressure is under acceptable limits, inflation may be recommended.

Additionally or alternatively, the pressure at a destination may be determined using the destination temperature. Equation (4) above allows any desired temperature to be used so, as well checking against local ambient temperature, a next destination temperature can be used. The next destination temperature can be taken from received forecast data or by consulting a database of historical averages at the destination, for example. A next destination which is colder than the aircraft's current location may mean that a tire requires inflation to compensate for the colder ambient temperature, even though the pressure at local ambient temperature is acceptable.

When a destination temperature indicates inflation is required, the additional pressure (the delta) to ensure sufficient gas temperature at the destination can be indicated as a maintenance action. The delta itself could be indicated as an additional inflation requirement, or the delta could be added to the most recent pressure measurement in the received historical data to give a target inflated current pressure, so that a maintainer can simply inflate the tire to that pressure. Giving a target inflated current pressure reduces the possibility for human error during the inflation process.

In some examples, a deflation rate calculated from the trend line of the stable points in the historical data is used to improve the accuracy of the determined pressure, so that deflation is no longer assumed to be zero. This can be particularly useful when the recent stable points is more than 24 hours old. Adjusting can use the following relation:

$$P_{compensated} = P_{unknown} - (\text{Deflation Rate} \times \text{Time}) \quad (5)$$

where $P_{compensated}$ is the pressure at the desired temperature adjusted for deflation, $P_{unknown}$ is calculated according to equation (4) above, Deflation Rate expresses a loss of pressure per unit time and Time is the time since the recent stable point used to determine $P_{unknown}$. Pressure can be expressed in any unit, such as psi, kPa or Bar, as long as it is consistent throughout.

In other examples, a deflation rate calculated from the trend line of stable points in the historical data is used not to correct the pressure measurement but to determine a timescale over which the assumption of no deflation holds true, so that an appropriate stable point within in that timescale can be selected. For example, if it is assumed that a maximum leakage of 1% is acceptable to allow the assumption of no leakage to apply, the deflation rate is used to calculate the period over which leakage will be 1%. If the trend line indicates a deflation rate of 0.5% leakage per 24 hours, this would mean that the recent stable point used for the calculations should be no more than 48 hours old. The choice of maximum leakage may be other than 1%, for example it can be 0.5%. 2%, 3%, 4% or 5%. This can be useful because the deflation rate depends to some extent on how an aircraft is used, if an aircraft is not used the rate of pressure loss is lower than for an aircraft with multiple flight cycles per day. Should no suitable stable point be available an error may be indicated, for example a message that "pressure cannot be determined accurately at present, allow the tire to stand for at least 3 hours and then carry out a standard pressure measurement".

Figure 8:
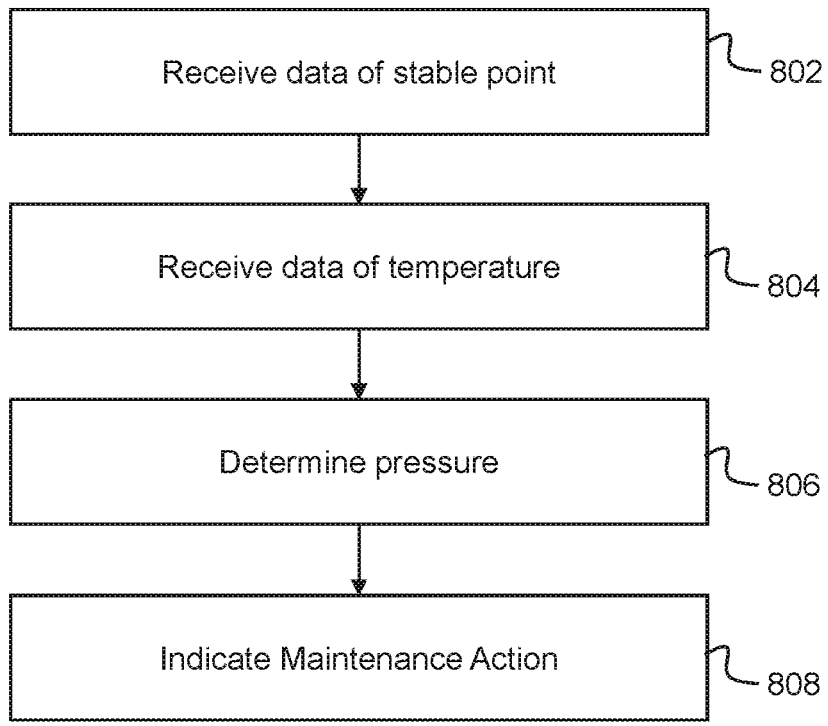
FIG. 8 is a flow chart of an example method of determining a tire pressure.

FIG. 8 is a flow chart of an example method of determining a tire pressure. The method can be carried by a maintenance device or by a system of the aircraft itself, such as a cockpit information system. At block 802, data of a recent stable point comprising both a gas temperature and a gas pressure of the tire. The stable point is identified as discussed above and is received over a communication interface from an external system or from a memory or storage of the device executing the method.

At block 804, data is received indicative of a desired temperature, at this the pressure is required to the determined. The desired temperature is a current ambient temperature at the location of the aircraft or an expected temperature at a future destination of the aircraft. The temperature is input by an operator or retrieved from a weather information service.

At block 806, the current pressure at the desired temperature is determined, using equation (4) above with the data of the stable point and desired temperature. In other examples, a known relation between pressure and temperature may be used instead of equation (4).

Once the current pressure is determined, a maintenance action is indicated at block 808. Maintenance actions can include at least one of: indicating that the tire should be replaced, indicating that the tire should be inflated and indicating that no maintenance is required. The indication could be visual or audible. A tire may be indicated for inflation when the current pressure is below a first inflation threshold but above a second inflation threshold. For example, the first threshold may be a predetermined inflation level for the tire (100%) and the second threshold may be 95% of the predetermined inflation level of the tire. Where inflation is indicated, this can additionally include a pressure to inflate the tire to or an additional pressure to add to the tire. Further thresholds may also be used for additional actions. These include: indicating reinflation with enhanced monitoring when the current pressure is between the second threshold and a third threshold; indicating replacement of the tire and/or wheel when the current pressure is between the third threshold and a fourth threshold, and indicating replacement of both wheels on the axle when the current pressure is lower than the fourth threshold. The third threshold can be 90% of the predetermined inflation level of the tire and the fourth threshold can be 80% of the predetermined inflation level of the tire. These thresholds and the actions are summarized in the table below:

| % of Desired pressure | Maintenance Action |
| --- | --- |
| <100% and >95% | Inflate |
| <95% and >90% | Inflate and measure pressure again in 24 hours (more frequent monitoring) |
| <90% and >80% | Replace wheel |
| <80% | Replace axle pair of wheels |

In addition to indicating the maintenance action, some examples may further include scheduling a maintenance action, which can occur in the same way as discussed above with reference to FIG. 5.

It can be useful to know the tire gas temperature at a point in time, for example to confirm that a safe working temperature has been reached so that a tire can be inflated. Although tire monitoring devices typically include a temperature sensor this is indirectly coupled to the gas and can lead or lag the gas temperature, particularly when temperatures are changing relatively rapidly. Through the use of historical data to identify a stable point a more accurate gas temperature can be determined by calculating it from a pressure rather than measuring it. Referring again to FIG. 7, at time=26 hours the temperature can be determined by measuring the pressure and then calculating the temperature using equation (3) and data of the last stable point at time=23 hours.

The measurement of pressure can be carried out at safe distance by requesting a tire pressure measurement from the tire monitoring device. Once the gas temperature is determined it can be used to provide a safety indication. For example, if the gas temperature is above a predetermined threshold, such as 50° C., an indication of "unsafe" can be provided showing that tire maintenance should not be attempted at this time. If the temperature is below the predetermined threshold, an indication of "safe" can be provided, showing that it is safe to commence tire maintenance. The indication could be visual, such as light or on a display or audible, such a beep or spoken instruction.

Figure 9:
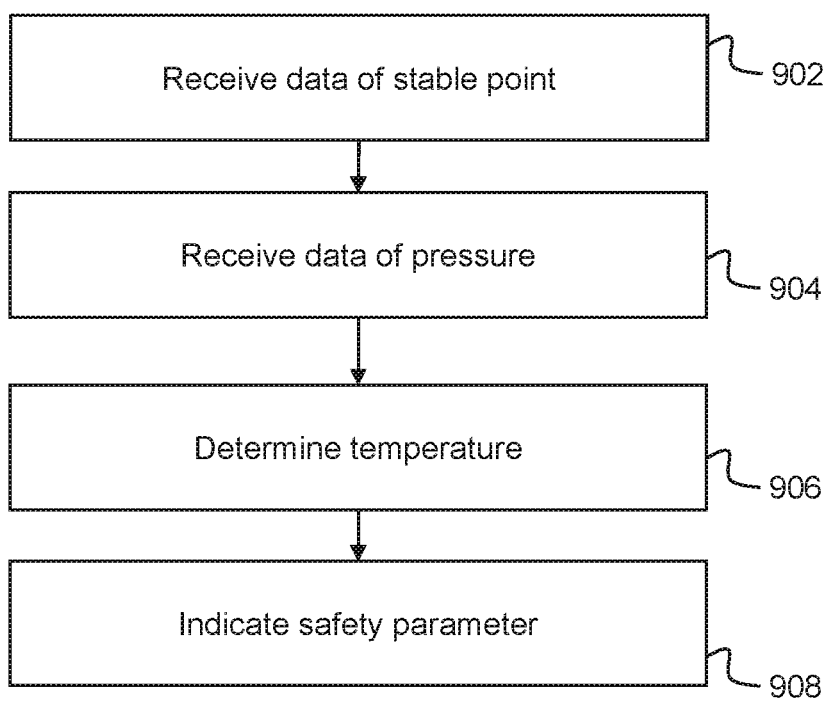
FIG. 9 is a flow chart of an example method of determining a current tire gas temperature.

A method of determining a current tire gas temperature is depicted in FIG. 9. The method can be carried by a maintenance device or by a system of the aircraft itself, such as a cockpit information system. At block 902, data of a recent stable point comprising both a gas temperature and a gas pressure of the tire. The stable point is identified as discussed above and is received over a communication interface from an external system or from a memory or storage of the device executing the method.

At block 904, data is received of the current pressure, for example a most recent pressure measurement may be used from received historical data, or a current pressure measurement may be caused to take place by a tire monitoring device.

At block 906, the current temperature is determined, using equation (3) above with the data of the stable point and current pressure. In other embodiments a known relation between pressure and temperature may be used instead of equation (3).

Once the current temperature is determined, a safety parameter is indicated at block 908. The safety parameter can at least one of the current temperature as determined and a "safe" or "unsafe" indication based on a comparison of the current temperature to a predetermined threshold. For example, if the current temperature is under the threshold, a "safe" indication can be given, showing that it is safe to carry out tire maintenance. This may enable tire maintenance to be carried out sooner than allowing a predetermined standing time, or may improve safety by indicating that a temperature is still too high even after the predetermined standing time.

The determination of a pressure at a desired temperature using the method of FIG. 8 can be combined with the determination of a current temperature using the method of FIG. 9. This can allow, for example, both the indication of a maintenance action and an indication of safety parameter for whether it is safe to carry out the maintenance action at the current time.

In some examples, the methods of FIGS. 8 and 9 can further comprising using a deflation rate calculated from the stable points in the historical data. The deflation rate can be can be applied to the data of the stable point improve the accuracy of the pressure or temperature determination, or to extrapolate the pressure at a future time. This can be useful when the stable point used in the calculations is older, such as more than 24 hours old. The deflation rate can be applied to the stable point before the determining the pressure or temperature. Alternatively, in the method of FIG. 8, the deflation rate can be applied to the pressure after converting from the stable point.

Figure 10:
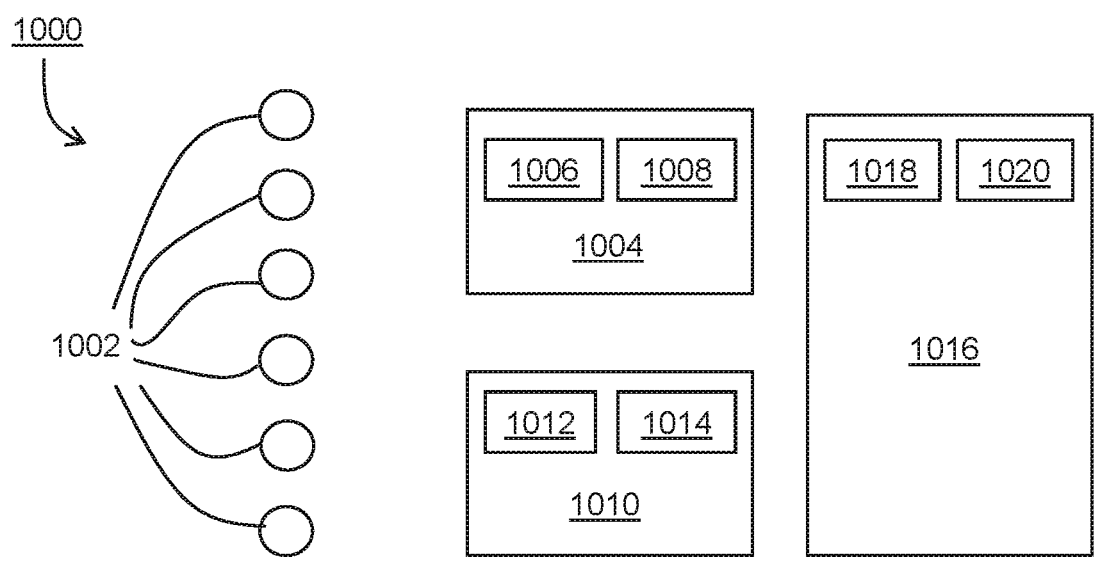
FIG. 10 shows a schematic representation of a system in which the method may be implemented

FIG. 10 is a schematic diagram of a system 1000 in which the methods of the present invention can be carried out. A plurality of tire monitoring devices 1002 as discussed above with reference to FIG. 1 are provided on a same aircraft. In this case there are six tire monitoring devices 1002 for a six-wheeled aircraft, such as an Airbus A320 discussed above with reference to FIG. 2. The tire monitoring devices 1002 are in communication with a cockpit information system 1004, which includes a processing system 1006 and a communication interface 1008. The tire monitoring devices are also in communication with a separate maintenance device 1010, such as a smart phone running a suitable app or another portable or hand-held device that can be used to interrogate the sensors and receive historical measurement data from the tire monitoring devices. Similar to the cockpit information system 1004, the maintenance device 1010 includes a processing system 1012 and a communication interface 1014.

One or both of the cockpit information system 1004 and the maintenance device 1010 is also in communication with a central maintenance system 1016. The central maintenance system 1016 comprises a processing system 1018 and a communication interface 1020. At predefined times, or in response to predetermined events, such as taking a tire pressure measurement, the cockpit information system and/or the maintenance device 1010 transmit historical data of tire pressure and temperature measurements to the central maintenance system using the communication interfaces. The communication interface 1008, 1014 of the cockpit information system and the maintenance device may comprise a separate interface for communicating with the central maintenance system or the same interface can be used as for communicating with the tire monitoring devices 1002. For example, the maintenance device communicates with the tire monitoring devices over a first wireless communication interface, such as according to an IEEE 802.11 standard or Bluetooth, and communicates with the central maintenance system 1016 over a second wireless communication interface, such as one according to a cellular standard, such as those defined by 3GPP or ETSI.

Reference to a "processing system" includes a system with one or more processors (which may have one or more cores) as well as distributed processing systems which may be distributed over a plurality of physical devices and/or locations.

Where methods have been described above, they can be implemented wholly in software, wholly in hardware (such as by an application specific integrated circuit) or any combination of software and hardware. A software implementation may comprise computer-readable medium comprising instructions that instruct a processor to carry out the method. The computer-readable medium may be a non-transitory computer readable medium.

It is to be noted that the term "or" as used herein is to be interpreted to mean "and/or", unless expressly stated otherwise.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A computer implemented method of determining a tire pressure, the method comprising:
   receiving data of a recent stable point comprising both a tire gas pressure and a temperature;
   receiving data of a desired temperature, at which a current pressure is desired to be determined;
   determining the current pressure based on the data of the recent stable point and the desired temperature; and
   indicating, by an indicating device, a maintenance action based on the determined current pressure wherein the maintenance action comprises one of replacing the tire, inflating the tire, or no maintenance of the tire.

2. A method according to claim 1, wherein the desired temperature is a current ambient temperature at the location of an aircraft.

3. A method according to claim 1, wherein the desired temperature is an expected ambient temperature at a future destination of an aircraft.

4. A method according to claim 1, wherein the data of the recent stable point further comprises a time, the method further comprising:
   receiving data of a deflation rate of the tire; and
   wherein the determining the current pressure is further based on the deflation rate.

5. A method according to claim 1, wherein the recent stable point is less than 24 hours old.

6. A method according to claim 1, further comprising:
   receiving historical data comprising a plurality of tire gas pressure and temperature measurements and an associated time stamp; and
   determining the recent stable point from the historical data.

7. A method according to claim 6, further comprising:
   acquiring the historical data by measuring the gas pressure and temperature at predetermined intervals.

8. A computer-implemented method of determining a gas temperature of a tire, the method comprising:
   receiving data of a recent stable point comprising both a tire gas pressure and a temperature;
   receiving data representative of a current measured gas pressure of the tire;
   determining the current gas temperature using the data of the recent stable point and the current measured gas pressure, and
   indicating a safety parameter based on the current gas temperature.

9. A method according to claim 8, wherein the data of the recent stable point further comprises a time associated with the recent stable point, the method further comprising:
   receiving data of a deflation rate; and wherein the determining the current gas temperature is further based on the deflation rate.

10. A method according to claim 8, wherein data representative of a current measured gas pressure of the tire is received wirelessly.

11. An apparatus comprising a processing system configured to implement a method comprising:
receiving data of a recent stable point comprising both a tire gas pressure and a temperature;
receiving data of a desired temperature, at which a current pressure is desired to be determined;
determining the current pressure based on the data of the recent stable point and the desired temperature; and,
indicating, by an indicating device, a maintenance action based on the determined current pressure wherein the maintenance action comprises one of replacing the tire, inflating the tire, or no maintenance of the tire.

12. A non-transitory computer readable medium comprising instructions that, when executed by a processing system, instruct the processing system to perform a method comprising:
receiving data of a recent stable point comprising both a tire gas pressure and a temperature;
receiving data of a desired temperature, at which a current pressure is desired to be determined;
determining the current pressure based on the data of the recent stable point and the desired temperature; and,
indicating, by an indicating device, a maintenance action based on the determined current pressure wherein the maintenance action comprises one of replacing the tire, inflating the tire, or no maintenance of the tire.

13. A system comprising:
a tire monitoring device comprising a communication interface and configured to measure and store tire gas pressure and temperature at predetermined intervals; an apparatus comprising a communication interface and a processing system, wherein the processing system is configured to:
receive data of the tire gas pressure and temperature from the tire monitoring device using the communication interface;
determine a stable point in data;
receive data of a desired temperature, at which a current pressure is desired to be determined;
determine the current pressure based on the data of the stable point and the desired temperature; and,
an indicating device, configured to indicate a maintenance action based on the determined current pressure wherein the maintenance action comprises one of replacing the tire, inflating the tire, or no maintenance of the tire.

* * * * *